United States Patent
Kato et al.

(10) Patent No.: US 12,394,537 B2
(45) Date of Patent: Aug. 19, 2025

(54) EXTERIOR MATERIAL, EXTERIOR MATERIAL CONNECTING BODY, WIRE HARNESS, AND METHOD OF MANUFACTURING WIRE HARNESS

(71) Applicant: YAZAKI CORPORATION, Tokyo (JP)

(72) Inventors: Tomokazu Kato, Tochigi (JP); Satoshi Enomoto, Tochigi (JP); Naoki Ishizuka, Tochigi (JP); Shinichi Tadokoro, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 220 days.

(21) Appl. No.: 18/334,298

(22) Filed: Jun. 13, 2023

(65) Prior Publication Data

US 2024/0006094 A1 Jan. 4, 2024

(30) Foreign Application Priority Data

Jun. 30, 2022 (JP) ................................ 2022-105524

(51) Int. Cl.
*H01B 7/00* (2006.01)
*B60R 16/02* (2006.01)
*H02G 3/04* (2006.01)

(52) U.S. Cl.
CPC ......... *H01B 7/0045* (2013.01); *H02G 3/0468* (2013.01); *B60R 16/0207* (2013.01)

(58) Field of Classification Search
None
See application file for complete search history.

(56) References Cited

U.S. PATENT DOCUMENTS 1,700,983 A * 2/1929 Hooley ................. H02G 3/06
285/179.1
1,711,995 A * 5/1929 Erickson ............... H02G 3/06
285/356

(Continued)

FOREIGN PATENT DOCUMENTS

JP S58-72925 U 5/1983
JP H05-020952 * 3/1993

(Continued)

OTHER PUBLICATIONS

Translation of JPH05-20952 (Year: 1993).*
Translation of WO2015099128 (Year: 2015).*

*Primary Examiner* — Timothy J. Dole
*Assistant Examiner* — Muhammed Azam
(74) *Attorney, Agent, or Firm* — KENEALY VAIDYA LLP

(57) ABSTRACT

An exterior material includes a bellows part that includes ridge parts annularly formed around a center axis along an axial direction and project toward one side in a radial direction intersecting the axial direction, and groove parts annularly formed around the center axis and are recessed toward another side in the radial direction, the ridge parts and the groove parts being alternately aligned along the axial direction, the bellows part being externally attached to a wiring material. The bellows part includes a first uneven region that has one first groove part and two first ridge parts, and a second uneven region that has one second groove part having an outer diameter relatively shorter than an inner diameter of the first groove part, and two second ridge parts having an outer diameter relatively shorter than an inner diameter of the first ridge part.

7 Claims, 11 Drawing Sheets

(56) References Cited

U.S. PATENT DOCUMENTS

| | | | | |
|---|---|---|---|---|
| 3,330,303 A * | 7/1967 | Fochler | H01B 7/1875 | 285/55 |
| 3,837,364 A * | 9/1974 | Jenner | F16C 1/06 | 138/122 |
| 4,037,626 A * | 7/1977 | Roberts, Jr. | F16L 9/127 | 138/155 |
| 4,214,147 A * | 7/1980 | Kraver | F28F 19/006 | 219/535 |
| 4,384,167 A * | 5/1983 | Nestor | H02G 3/06 | 174/72 A |
| 4,867,203 A * | 9/1989 | Putter | F16L 9/16 | 405/150.1 |
| 4,970,351 A * | 11/1990 | Kirlin | H02G 3/0406 | 174/136 |
| 5,160,811 A * | 11/1992 | Ritzmann | H02G 3/0691 | 285/236 |
| 6,051,789 A * | 4/2000 | Kato | B29C 48/13 | 174/72 A |
| 6,186,182 B1 * | 2/2001 | Yoon | F16L 9/06 | 138/144 |
| 6,323,425 B1 * | 11/2001 | Hegler | B29C 53/02 | 174/68.3 |
| 6,488,053 B1 * | 12/2002 | Tadokoro | F16L 11/15 | 174/92 |
| 6,491,067 B1 * | 12/2002 | Davenport | H02G 3/0468 | 138/156 |
| 6,774,312 B2 * | 8/2004 | Fatato | F16L 57/00 | 174/74 A |
| 6,848,478 B2 * | 2/2005 | Nagai | F16L 27/1004 | 138/135 |
| 7,798,534 B2 * | 9/2010 | Louden | H02G 3/06 | 285/392 |
| 7,891,383 B2 * | 2/2011 | Baverel | B29C 48/303 | 138/156 |
| 7,939,761 B2 * | 5/2011 | Baverel | B29C 48/09 | 174/95 |
| 8,497,425 B2 * | 7/2013 | Morrow | F16L 1/11 | 138/104 |
| 8,569,622 B2 * | 10/2013 | Katou | H02G 3/0468 | 174/72 A |
| 8,646,490 B2 * | 2/2014 | Frohne | F16L 55/02781 | 138/171 |
| 9,163,756 B2 * | 10/2015 | Sugiyama | F16L 11/11 | |
| 9,387,818 B2 * | 7/2016 | Sugimoto | B60R 16/0215 | |
| 9,505,358 B2 * | 11/2016 | Ichikawa | H01B 7/04 | |
| 9,734,935 B2 * | 8/2017 | Yoshida | H01B 7/0045 | |
| 9,812,230 B2 * | 11/2017 | Tsukamoto | B29C 45/14549 | |
| 9,889,805 B2 * | 2/2018 | Yanazawa | B60R 16/0215 | |
| 10,193,315 B2 * | 1/2019 | Chu | H02G 3/0691 | |
| 10,199,811 B2 * | 2/2019 | Chu | H02G 3/0468 | |
| 10,272,855 B2 * | 4/2019 | Yabashi | F16L 5/10 | |
| 10,277,017 B2 * | 4/2019 | Yoshida | H02G 3/0468 | |
| 11,063,412 B2 * | 7/2021 | Takamatsu | F16L 11/11 | |
| 11,283,249 B2 * | 3/2022 | Marugami | H02G 3/0616 | |
| 11,373,785 B2 * | 6/2022 | Kiyota | H01B 17/583 | |
| 11,433,831 B2 * | 9/2022 | Nishi | H02G 3/263 | |
| 11,738,702 B2 * | 8/2023 | Yabashi | F16L 5/02 | 174/72 A |
| 11,742,643 B2 * | 8/2023 | Kiuchi | B60R 16/0215 | 138/121 |
| 11,804,700 B2 * | 10/2023 | Takagi | H02G 3/0406 | |
| 2006/0201567 A1 * | 9/2006 | Goddard | F16L 9/00 | 138/121 |
| 2012/0318397 A1 * | 12/2012 | Rousseau | H02G 3/0468 | 264/165 |
| 2014/0110011 A1 * | 4/2014 | Omura | H02G 3/0468 | 264/249 |
| 2015/0008032 A1 * | 1/2015 | Nakai | B60R 16/0222 | 174/650 |
| 2016/0238166 A1 * | 8/2016 | Fukuda | B60R 16/0215 | |
| 2018/0248346 A1 * | 8/2018 | Yoshida | H02G 3/0468 | |
| 2018/0265018 A1 * | 9/2018 | Yabashi | F16L 5/10 | |
| 2019/0048780 A1 * | 2/2019 | Cho | F16L 51/025 | |
| 2019/0123531 A1 * | 4/2019 | Yoshimura | H02G 3/0691 | |
| 2020/0099207 A1 * | 3/2020 | Takamatsu | F16L 11/11 | |
| 2020/0321757 A1 * | 10/2020 | Kawamura | H02G 3/0468 | |
| 2020/0389000 A1 * | 12/2020 | Kiuchi | B60R 16/0207 | |
| 2024/0006094 A1 * | 1/2024 | Kato | H01B 7/0045 | |
| 2024/0297486 A1 * | 9/2024 | Ueta | H02G 3/22 | |

FOREIGN PATENT DOCUMENTS

| | | | | |
|---|---|---|---|---|
| JP | 3168436 U | * | 6/2011 | |
| JP | 2011-254614 A | | 12/2011 | |
| JP | 2015146672 A | * | 8/2015 | |
| JP | 2015-186400 A | | 10/2015 | |
| JP | 6137012 B2 | * | 5/2017 | |
| KR | 100773083 B1 | * | 11/2007 | |
| WO | WO-2015025893 A1 | * | 2/2015 | H02G 3/0468 |
| WO | WO-2015099128 A1 | * | 7/2015 | H02G 3/0468 |

* cited by examiner

EXTERIOR MATERIAL, EXTERIOR MATERIAL CONNECTING BODY, WIRE HARNESS, AND METHOD OF MANUFACTURING WIRE HARNESS

CROSS-REFERENCE TO RELATED APPLICATION(S)

The present application claims priority to and incorporates by reference the entire contents of Japanese Patent Application No. 2022-105524 filed in Japan on Jun. 30, 2022.

BACKGROUND OF THE INVENTION

1. Field of the Invention

The present invention relates to an exterior material, an exterior material connecting body, a wire harness, and a method of manufacturing a wire harness.

2. Description of the Related Art

Conventionally, a corrugated tube is known as an exterior member for protecting a wire harness from outside. By housing a wiring material within the internal space of a tubular main body, the corrugated tube protects the wiring material from external peripheral components by covering the wiring material from outside. For example, as a corrugated tube, a wire protection tube with bellows arranged at unequal pitches in a single tube body is disclosed (for example, see Japanese Unexamined Utility Model Application Publication No. S58-72925).

Moreover, a double structure corrugated tube is disclosed in which a corrugated tube is formed in a double structure, the outer corrugated tube is formed without a slit, and the pitch of the adjacent ridge parts of the inner corrugated tube is narrower than the pitch of the adjacent groove parts of the outer corrugated tube (for example, see Japanese Patent Application Laid-open No. 2011-254614).

Furthermore, a double structure corrugated tube is disclosed in which a first annular projection part of the inner corrugated tube has a coated part covered by a second annular projection part of the outer corrugated tube, and at least the pitch of the coated part of the first annular projection part is multiple times than that of the second annular projection part in the axial direction (for example, see Japanese Patent Application Laid-open No. 2015-186400).

Incidentally, the corrugated tube is obtained by combining tubes selected from a plurality of tubes with different tube lengths prepared in advance, according to the design size of the wire harness in the extending direction. Thus, to fix two tubes with different lengths to a wire harness, due to the tube structure, there is a room for improvement in terms of a double operation of fixing the wire harness to both ends of one tube, before fixing the wire harness to both ends of the other tube.

SUMMARY OF THE INVENTION

An object of the present invention is to provide an exterior material, an exterior material connecting body, a wire harness, and a method of manufacturing a wire harness capable of improving the workability of manufacturing a wire harness.

In order to achieve the above mentioned object, an exterior material according to one aspect of the present invention includes a bellows part that includes a plurality of ridge parts annularly formed around a center axis along an axial direction and that project toward one side in a radial direction intersecting the axial direction, and a plurality of groove parts annularly formed around the center axis and that are recessed toward another side in the radial direction, the ridge parts and the groove parts being alternately aligned along the axial direction, and the bellows part being externally attached to a wiring material, wherein the bellows part includes a first uneven region that has at least one first groove part among the groove parts, and at least one first ridge part among the ridge parts, and a second uneven region that has at least one second groove part having an outer diameter relatively shorter than an inner diameter of the first groove part, among the groove parts, and at least one second ridge part having an outer diameter relatively shorter than an inner diameter of the first ridge part, among the ridge parts, and the first uneven region and the second uneven region are alternately aligned along the axial direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an exterior material, an exterior material connecting body, a wire harness, and a method of manufacturing a wire harness according to the present invention will be described in detail with reference to the accompanying drawings. However, the present invention is not limited to the following embodiment. Moreover, components in the following embodiment include components that can be easily replaced by those skilled in the art, or components substantially the same.

EMBODIMENT

Figure 1:
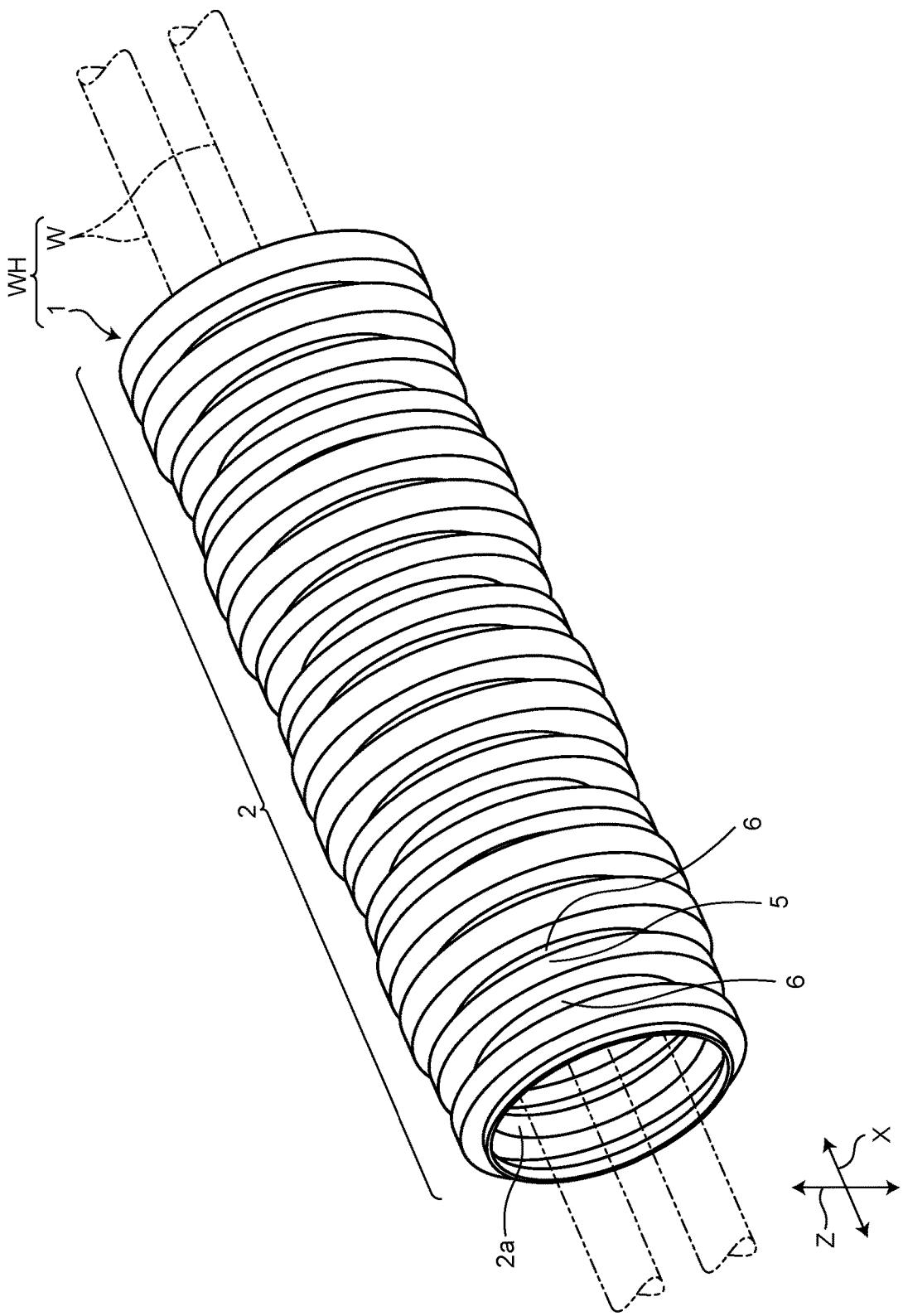
FIG. 1 is a perspective view of a wire harness according to an embodiment.
Figure 2:
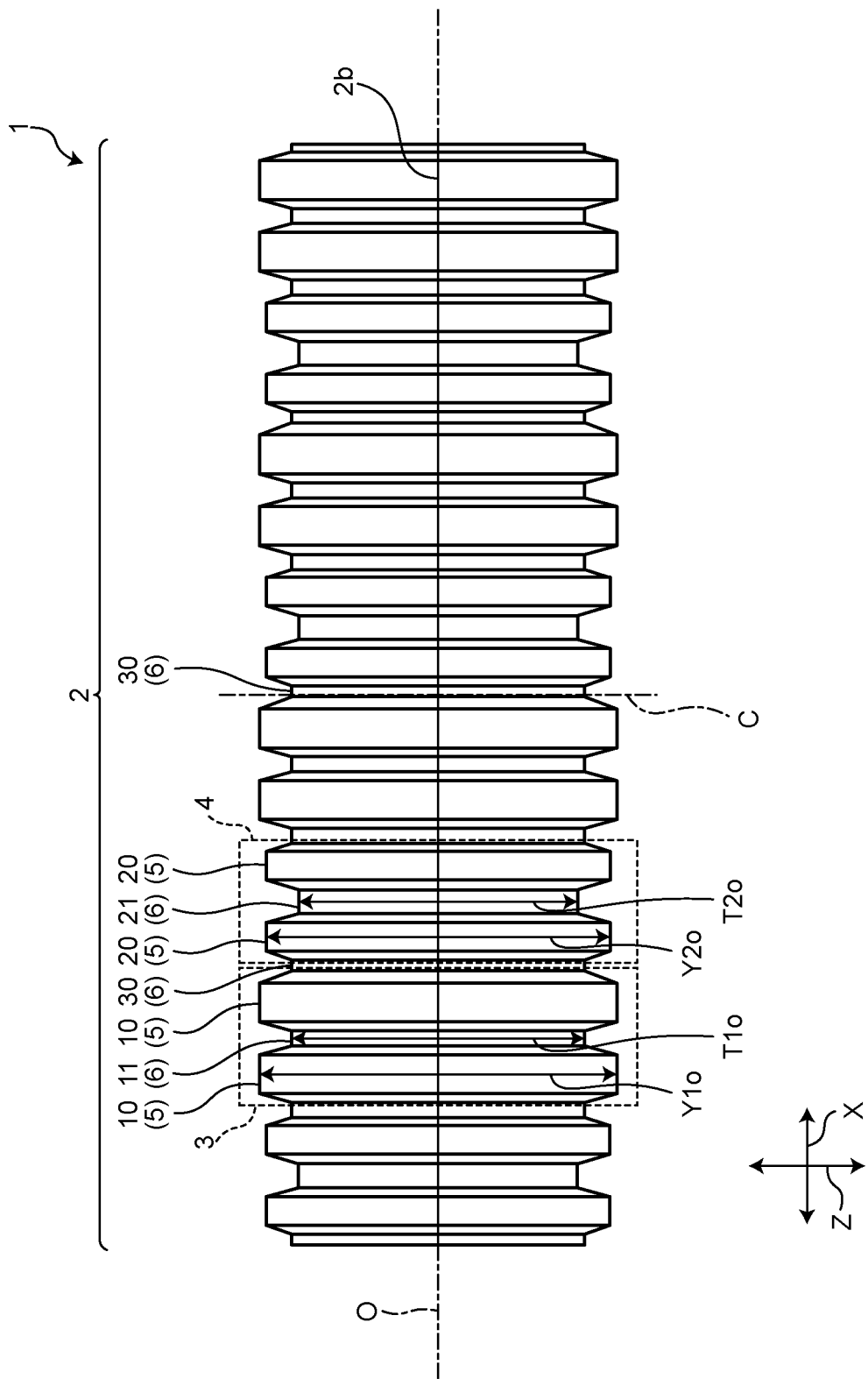
FIG. 2 is a plan view of an exterior material according to the embodiment.

For example, an exterior material 1 illustrated in FIG. 1 and FIG. 2 is incorporated into a wire harness WH routed in a vehicle such as an automobile. The exterior material 1 is externally attached to one or more wiring materials W, and protects the wiring materials W from external damage. Moreover, the exterior material 1 can bundle the wiring materials W as an electric wire bundle. The exterior material 1 in the present embodiment has a structure for connecting exterior materials to each other. The wiring materials W illustrated in FIG. 1 (and FIG. 8) are illustrated by two-dot chain lines, and the wiring materials W are omitted in FIG. 2 (and FIG. 9).

In the following illustration, the X direction is an axial direction X of the exterior material 1 (and an exterior material connecting body 100) in the present embodiment. The Z direction is a radial direction Z of the exterior material 1 (and the exterior material connecting body 100) in the present embodiment, and is a direction that intersects the axial direction X. For example, the axial direction X and the radial direction Z are orthogonal to each other.

For example, to connect between various electronic devices mounted on a vehicle, the wire harness WH bundles a plurality of wiring materials W used for power supply and signal communication into a collective component. The wire harness WH connects the wiring materials W to the devices using a connector and the like. The wire harness WH includes the conductive wiring material W, and the exterior material 1 that is attached to the wiring material W and that protects the wiring material W. For example, the wiring material W is formed by an electric wire, an electric wire bundle, and the like having flexibility. The electric wire is obtained by covering the outside of a conductor part (core wire) made of a plurality of metal strands having conductivity, with a coating part having insulation properties. The electric wire bundle is obtained by bundling the electric wires. In addition to the above, the wire harness WH may also include a connector, a fixture, and the like.

For example, the exterior material 1 is molded from materials such as polyolefin-based resin, polyamide-based resin, vinyl chloride-based resin, silicone-based resin, fluorine-based resin, polycarbonate-based resin, polyimide-based resin, polyester-based resin, and polyurethane-based resin. The exterior material 1 is annularly formed around a center axis O along the axial direction X, is externally attached to one or more wiring materials W, and protects the wiring materials W. As illustrated in FIG. 1 and FIG. 2, the exterior material 1 has a bellows part 2.

The bellows part 2 has flexibility and is externally attached to the wiring material W in a bendable manner, according to the shape of the wiring material W in the extending direction. The bellows part 2 includes an interior space 2a and a slit 2b. The interior space 2a is formed inside the bellows part 2 in the radial direction Z, and while the exterior material 1 is externally attached to the wiring material W, a part of the wiring material W is housed in the interior space 2a. The slit 2b is a notch linearly formed on the bellows part 2 along the axial direction X. A part of the wiring material W is housed in the interior space 2a of the bellows part 2 via the slit 2b.

Figure 3:
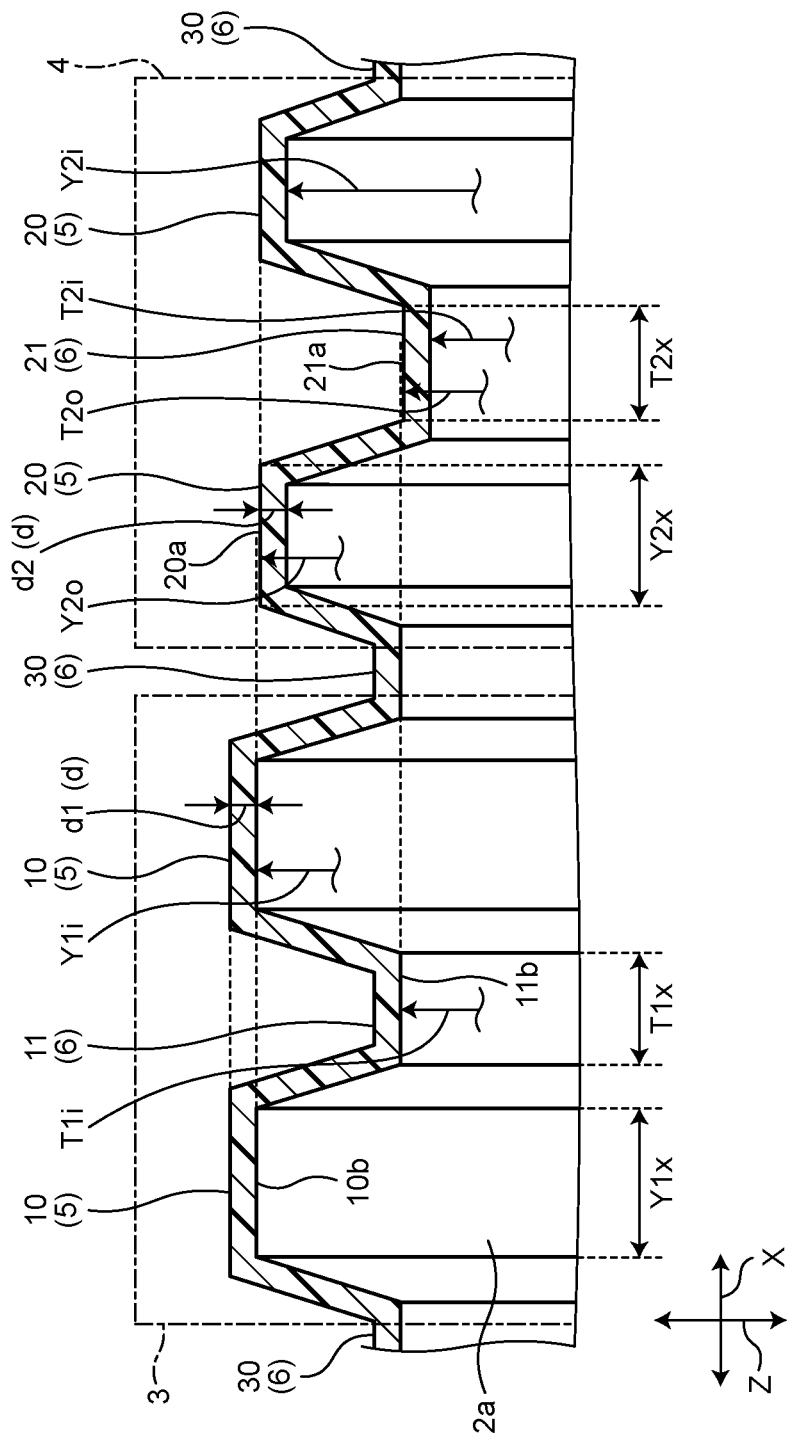
FIG. 3 is a partially enlarged sectional view of the exterior material according to the embodiment.

The bellows part 2 includes a plurality of ridge parts 5 and a plurality of groove parts 6. The ridge parts 5 and the groove parts 6 are integrally molded by injecting heated and melted resin material into a mold, and by cooling and solidifying the resin material. In the bellows part 2, the ridge parts 5 and the groove parts 6 are alternately arranged along the axial direction X. The bellows part 2 is formed in a tubular shape, and as illustrated in FIG. 3, has a constant thickness d.

In the bellows part 2, each of the ridge parts 5 is a portion annularly formed around the center axis O along the axial direction X, and that projects toward one side in the radial direction Z intersecting the axial direction X. In this example, one side in the radial direction Z is a direction opposite to the direction toward the center axis O, and is the radially outer side. The ridge parts 5 are each formed in the same annular shape, and are aligned along the axial direction X. For example, the ridge parts 5 are formed in a tubular shape around the center axis O. In this example, the ridge parts 5 are formed in a cylindrical shape. For example, the ridge parts 5 are formed such that the exterior wall surface exposed to the outside is formed in a cylindrical shape along the axial direction X, and the inner wall surface on the inside that is placed opposite to the exterior wall surface in the radial direction Z is formed in a cylindrical shape along the axial direction X. As illustrated in FIG. 3, the thickness d of each of the ridge parts 5 is the same. In this example, the thickness d of the ridge part 5 is the thickness of the ridge part 5 in the radial direction Z. The groove part 6 is provided between one of the ridge parts 5 and the other ridge part 5 that are adjacent to each other.

In the bellows part 2, the groove part 6 is a portion annularly formed around the center axis O, and is recessed toward the other side in the radial direction Z. In this example, the other side in the radial direction Z is a direction toward the center axis O, and is the radially inner side. The groove parts 6 are each formed in the same annular shape, and are aligned along the axial direction X. For example, the groove parts 6 are formed in a tubular shape the diameter of which is smaller than that of the ridge parts 5 around the center axis O. In this example, the groove parts 6 are formed in a cylindrical shape. For example, the groove parts 6 are formed such that the exterior wall surface exposed to the outside is formed in a cylindrical shape along the axial direction X, and the inner wall surface on the inside that is placed opposite to the exterior wall surface in the radial direction Z is formed in a cylindrical shape along the axial direction X. As illustrated in FIG. 3, the thickness d of each of the groove parts 6 is the same. In this example, the thickness d of the groove part 6 is the thickness of the groove part 6 in the radial direction Z. The ridge part 5 is provided between one of the groove parts 6 and the other groove part 6 that are adjacent to each other.

The bellows part 2 includes a plurality of first uneven regions 3 and a plurality of second uneven regions 4. The first uneven regions 3 and the second uneven regions 4 are alternately aligned along the axial direction X. Each of the first uneven regions 3 and the second uneven regions 4 are connected to each other via one groove part 6. In the bellows part 2 in the present embodiment, the first uneven region 3 is located on an end part on one side in the axial direction X, and the second uneven region 4 is located on an end part on the other side.

Figure 6:
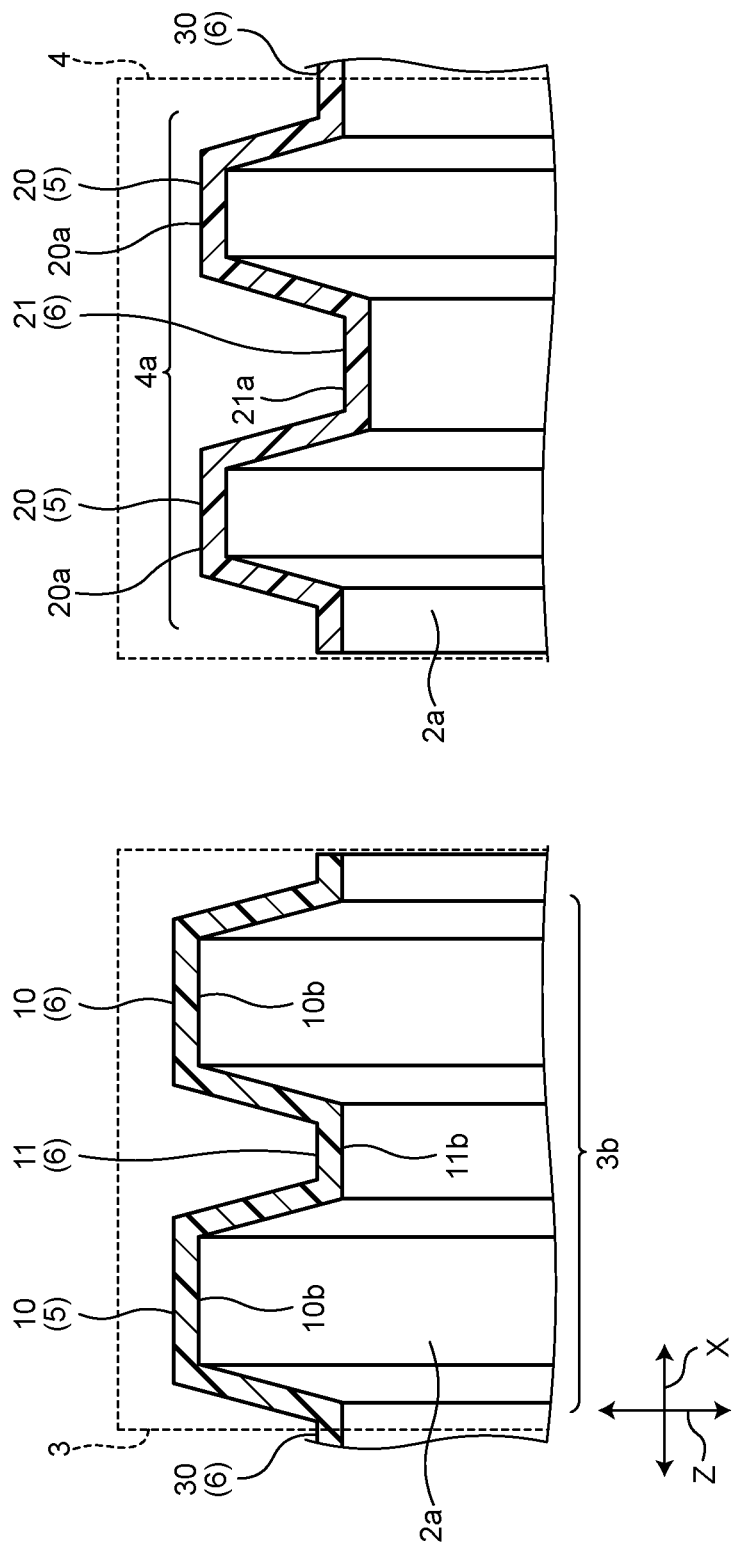
FIG. 6 is a partially enlarged sectional view of connection parts before the exterior materials according to the embodiment are connected.

As illustrated in FIG. 2 and FIG. 3, the first uneven region 3 includes one first groove part 11 among the groove parts 6, and two first ridge parts 10 among the ridge parts 5. Specifically, the first uneven region 3 is provided along the axial direction X, and is formed by the two first ridge parts 10 with the one first groove part 11 interposed therebetween. As illustrated in FIG. 6, the first uneven region 3 has an uneven portion 3b formed in an uneven shape on the radially inner side of the first uneven region 3.

The two first ridge parts 10 have the same outer diameter and the inner diameter in the radial direction Z, and each of the first ridge parts 10 has an outer diameter Y1o and an inner diameter Y1i. The first groove part 11 has an outer diameter T1o of the first groove part 11 and an inner diameter T1i of the first groove part 11 along the radial direction Z. The outer diameter Y1o of each of the first ridge parts 10 is formed relatively longer than the outer diameter T1o of the first groove part 11 (Y1o>T1o). The inner diameter Y1i of each first ridge part 10 is formed relatively longer than the inner diameter T1i of the first groove part 11 (Y1i>T1i). The first ridge part 10 has an inner peripheral surface 10b orthogonal to the radial direction Z, on the interior space 2a side of the bellows part 2. The first groove part 11 has an inner peripheral surface 11b orthogonal to the radial direction Z, on the interior space 2a side of the bellows part 2. The uneven portion 3b includes one inner peripheral surface 11b and two inner peripheral surfaces 10b that are continuous along the axial direction X of the bellows part 2 with the inner peripheral surface 11b interposed therebetween. The length Y1x of the inner peripheral surface 10b in the axial direction X is formed longer than the length T1x of the inner peripheral surface 11b in the axial direction X (Y1x>T1x).

As illustrated in FIG. 2 and FIG. 3, the second uneven region 4 includes one second groove part 21 among the groove parts 6, and two second ridge parts 20 among the ridge parts 5. Specifically, the second uneven region 4 is provided along the axial direction X, and is formed by the two second ridge parts 20 with the one second groove part 21 interposed therebetween. As illustrated in FIG. 6, the second uneven region 4 has an uneven portion 4a formed in an uneven shape on the radially outer side of the second uneven region 4.

The two second ridge parts 20 have the same outer diameter and inner diameter in the radial direction Z, and each of the second ridge parts 20 has an outer diameter Y2o and an inner diameter Y2i. The second groove part 21 has an outer diameter T2o of the second groove part 21 and an inner diameter T2i of the second groove part 21 along the radial direction Z. The outer diameter Y2o of each of the second ridge parts 20 is formed relatively longer than the outer diameter T2o of the second groove part 21 (Y2o>T2o). The inner diameter Y2i of each second ridge part 20 is formed relatively longer than the inner diameter T2i of the second groove part 21 (Y2i>T2i). The second ridge part 20 has an outer peripheral surface 20a orthogonal to the radial direction Z, on the outside opposite to the interior space 2a of the bellows part 2. The second groove part 21 has an outer peripheral surface 21a orthogonal to the radial direction Z, on the outside opposite to the interior space 2a of the bellows part 2. The uneven portion 4a includes one outer peripheral surface 21a, and two outer peripheral surfaces 20a that are continuous along the axial direction X of the bellows part 2 with the outer peripheral surface 21a interposed therebetween. The length (width) Y2x of the outer peripheral surface 20a in the axial direction X is formed longer than the length T2x of the outer peripheral surface 21a in the axial direction X (Y2x>T2x).

The outer diameter Y2o of each of the second ridge parts 20 is formed shorter than the outer diameter Y1o of each of the first ridge parts 10 (Y2o<Y1o). The outer diameter T2o of the second groove part 21 is formed shorter than the outer diameter T1o of the first groove part 11 (T2o<T1o). The outer diameter Y2o of the second ridge part 20 in the present embodiment is formed relatively shorter than the inner diameter Y1i of the first ridge part 10 (Y2o<Y1i). The outer diameter T2o of the second groove part 21 is formed relatively shorter than the inner diameter T1i of the first groove part 11 (T2o<T1i).

The length Y2x of each outer peripheral surface 20a in the axial direction X is formed relatively shorter than the length Y1x of each inner peripheral surface 10b in the axial direction X (Y2x<Y1x). The length T2x of the outer peripheral surface 21a in the axial direction X is formed relatively longer than the length T1x of the inner peripheral surface 11b in the axial direction X (T2x>T1x).

Figure 4:
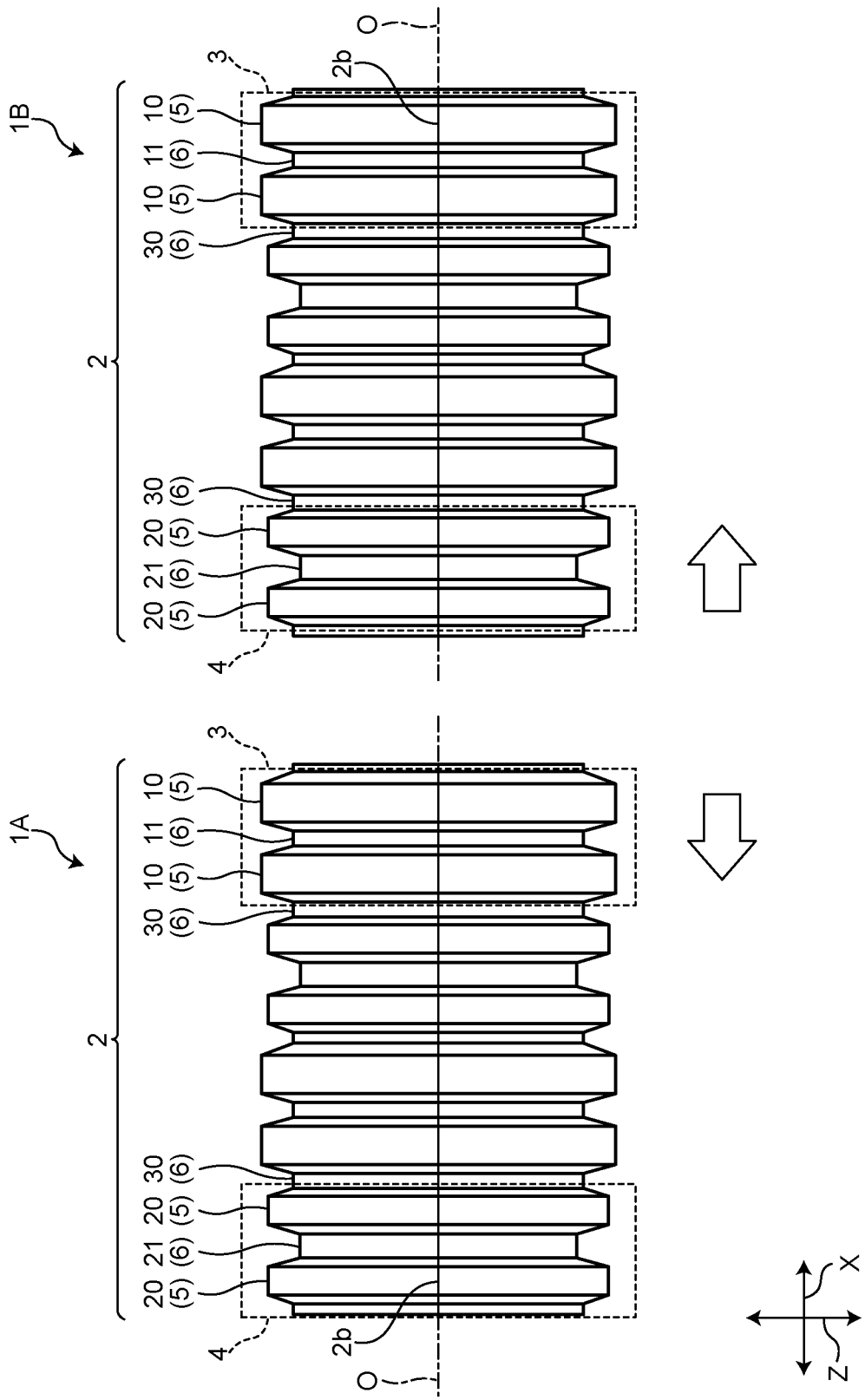
FIG. 4 is a plan view for explaining a method of dividing the exterior material according to the embodiment.

The exterior material 1 in the present embodiment can be divided into two exterior materials 1A and 1B illustrated in FIG. 4, by cutting the bellows part 2 at a division location C illustrated in FIG. 2. The division location C is provided on a third groove part 30 that connects the first uneven region 3 and the second uneven region 4, among the groove parts 6 in the bellows part 2. That is, the first uneven region 3 and the second uneven region 4 are connected to each other via the third groove part 30, along the axial direction X of the bellows part 2. The cross-section of the division location C on the bellows part 2 is a plane orthogonal to the center axis O.

Figure 5:
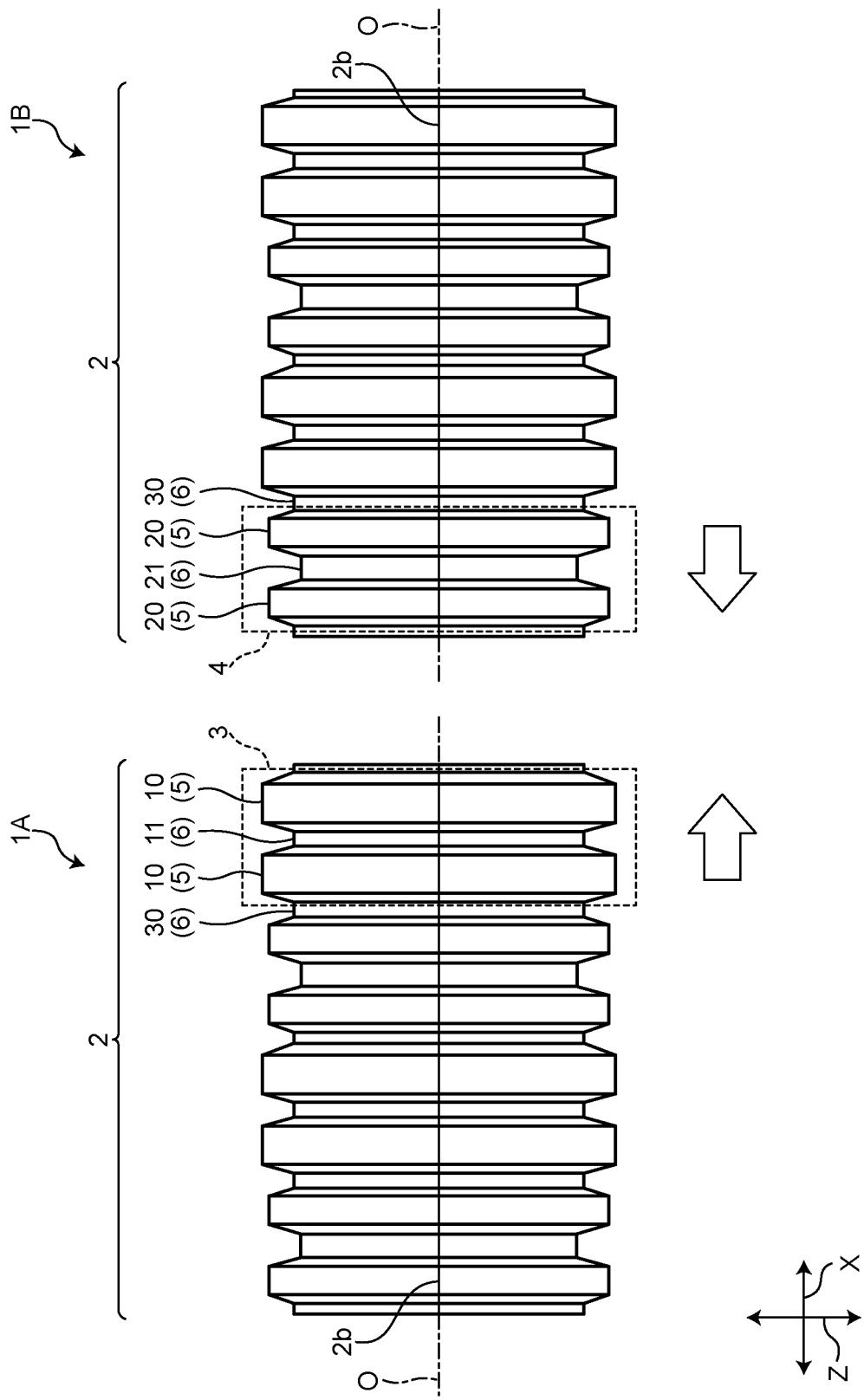
FIG. 5 is a plan view for explaining a method of connecting the exterior materials according to the embodiment.
Figure 7:
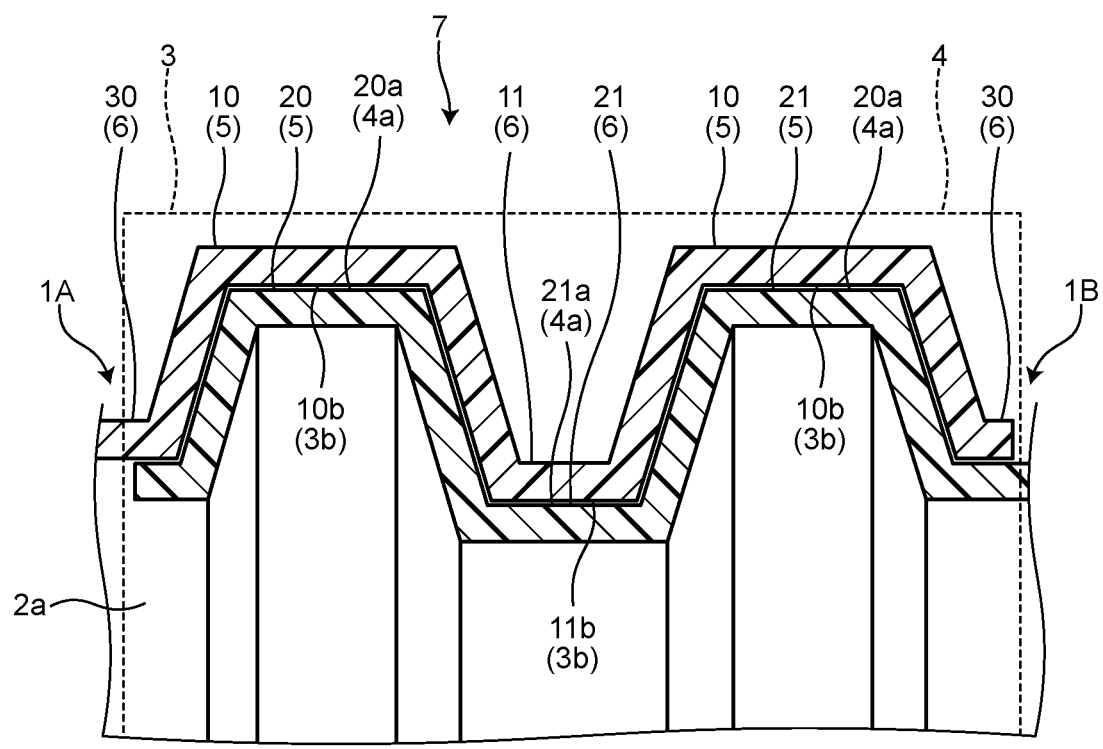
FIG. 7 is a partially enlarged sectional view of the connection parts after the exterior materials according to the embodiment are connected.

As illustrated in FIG. 5, each of the exterior materials 1A and 1B has the bellows part 2, and the first uneven region 3 is located on an end part on one side in the axial direction X of each bellows part 2, and the second uneven region 4 is located on an end part on the other side. The exterior materials 1A and 1B are connectable in the axial direction X. That is, as illustrated in FIG. 6 and FIG. 7, the exterior material 1A and the exterior material 1B are connected to each other, by overlapping the second uneven region 4 located on an end part on the other side in the axial direction X of the bellows part 2 in the exterior material 1B, to the radially inner side of the first uneven region 3 located on an end part on one side in the axial direction X of the bellows part 2 in the exterior material 1A. For example, by connecting the exterior material 1A and the exterior material 1B, an exterior material connecting body 100 as illustrated in FIG. 8 and FIG. 9 is formed.

Figure 8:
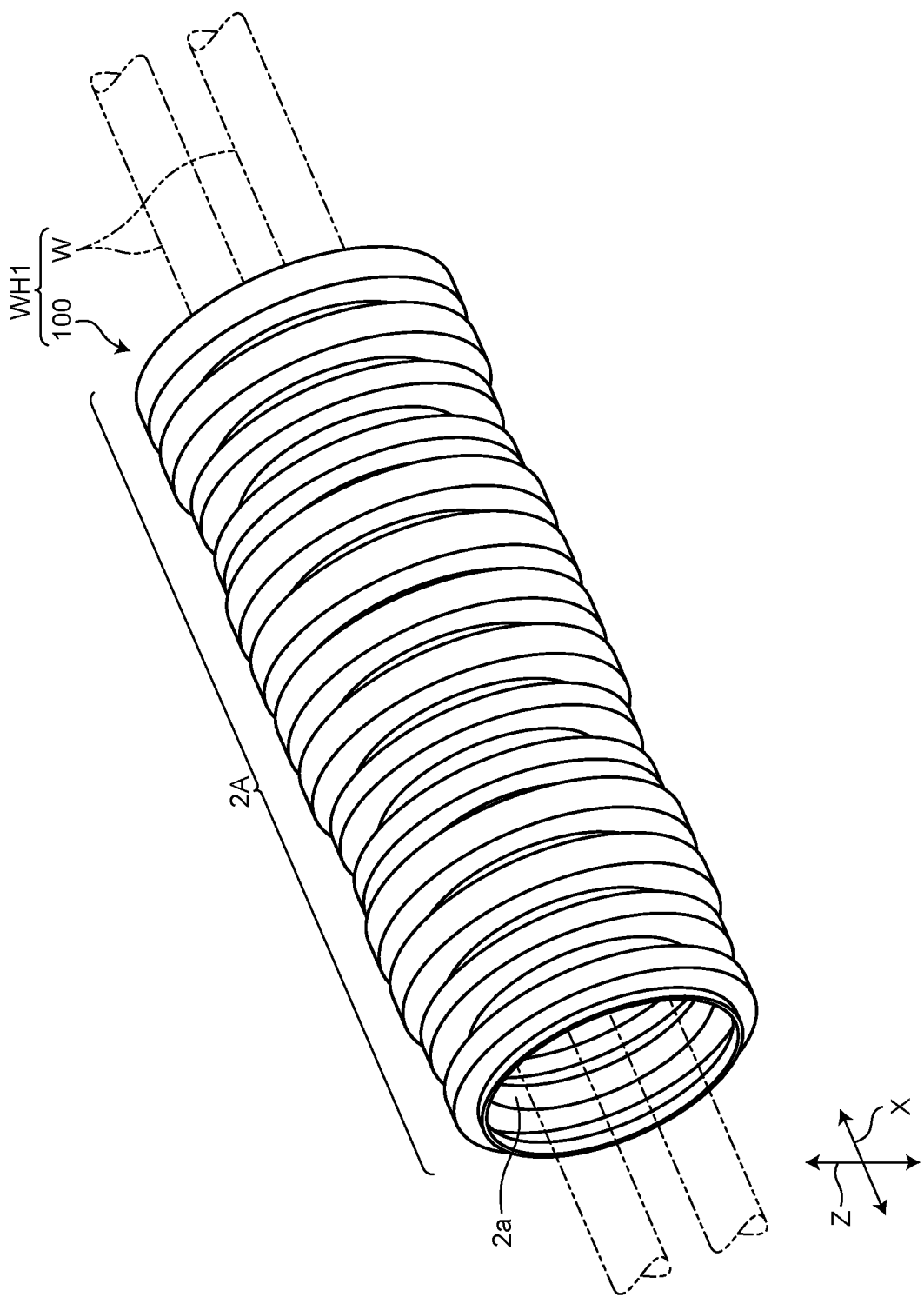
FIG. 8 is a perspective view of an exterior material connecting body according to the embodiment.
Figure 9:
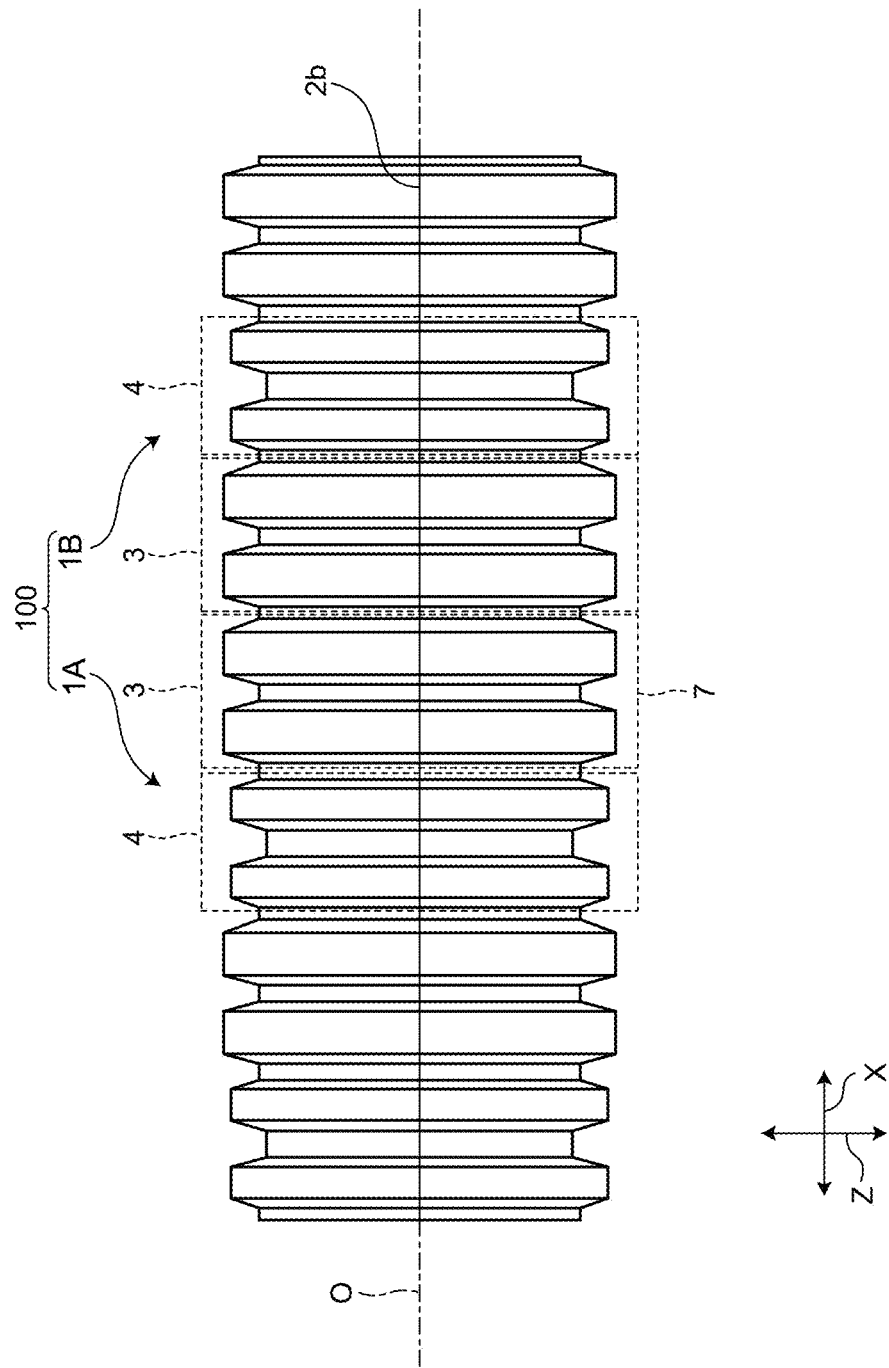
FIG. 9 is a plan view of the exterior material connecting body according to the embodiment.

As illustrated in FIG. 8 and FIG. 9, similar to the exterior material 1, the exterior material connecting body 100 is incorporated into the wire harness WH1, and by being externally attached to the wiring material W, protects the wiring material W from external damage. The exterior material connecting body 100 is formed by connecting two or more exterior materials to each other. Similar to the exterior material 1, the exterior material connecting body 100 has a bellows part 2A.

The bellows part 2A includes the first uneven regions 3 and the second uneven regions 4. However, the bellows part 2A is different from the bellows part 2 described above in including at least one connection part 7. The bellows part 2A has the interior space 2a and the slit 2b. The interior space 2a of the bellows part 2A is obtained by connecting the interior spaces 2a of the exterior materials 1A and 1B to each other in the axial direction X. The slit 2b of the bellows part 2A is obtained by connecting the slits 2b of the exterior materials 1A and 1B to each other along the axial direction X.

The connection part 7 is a portion where the exterior materials are connected to each other along the axial direction X. As illustrated in FIG. 9, in the axial direction X of the bellows part 2A, the connection part 7 is one of the adjacent first uneven regions 3, among the first uneven regions 3. That is, in the bellows part 2A in which the first uneven regions 3 and the second uneven regions 4 are alternately aligned along the axial direction X, the connection part 7 is one of the continuous first uneven regions 3. As illustrated in FIG. 7, the connection part 7 is a portion where the first uneven region 3 of the exterior material 1A is overlapped with the second uneven region 4 of the exterior material 1B from the radially outer side. In other words, in the connection part 7, the uneven portion 4a formed on the radially outer side of the second uneven region 4 faces the uneven portion 3b formed on the radially inner side of the first uneven region 3 in the radial direction Z, and the uneven portion 3b and the uneven portion 4a are fitted to each other (FIG. 7).

Figure 10:
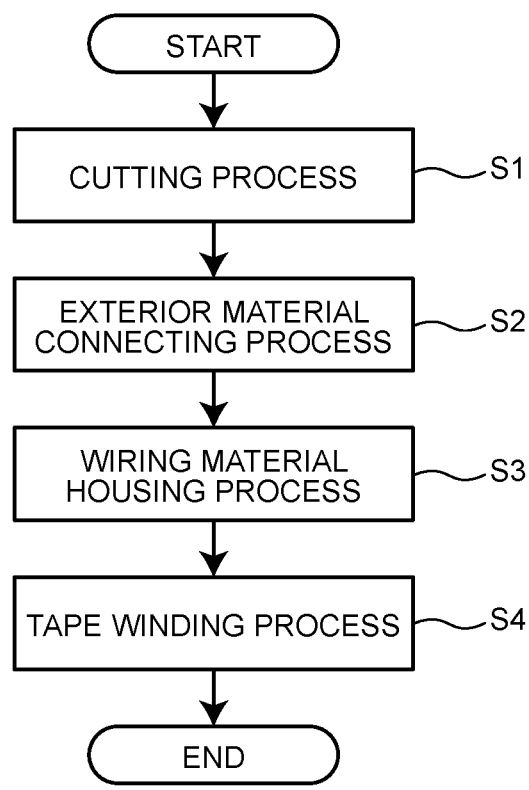
FIG. 10 is a flowchart illustrating a flow of manufacturing the wire harnesses according to the embodiment.

Next, a method of manufacturing the wire harness WH according to the present embodiment will be described with reference to the drawings. The following description will be made based on the flowchart in FIG. 10, while appropriately referring to other drawings. The method of manufacturing a wire harness described below may be performed manually by a worker using various devices, instruments, tools, and the like, or may be performed automatically by various manufacturing devices.

The method of manufacturing a wire harness of the present embodiment includes a cutting process (step S1), an exterior material connecting process (step S2), a wiring material housing process (step S3), and a tape winding process (step S4).

Figure 11:
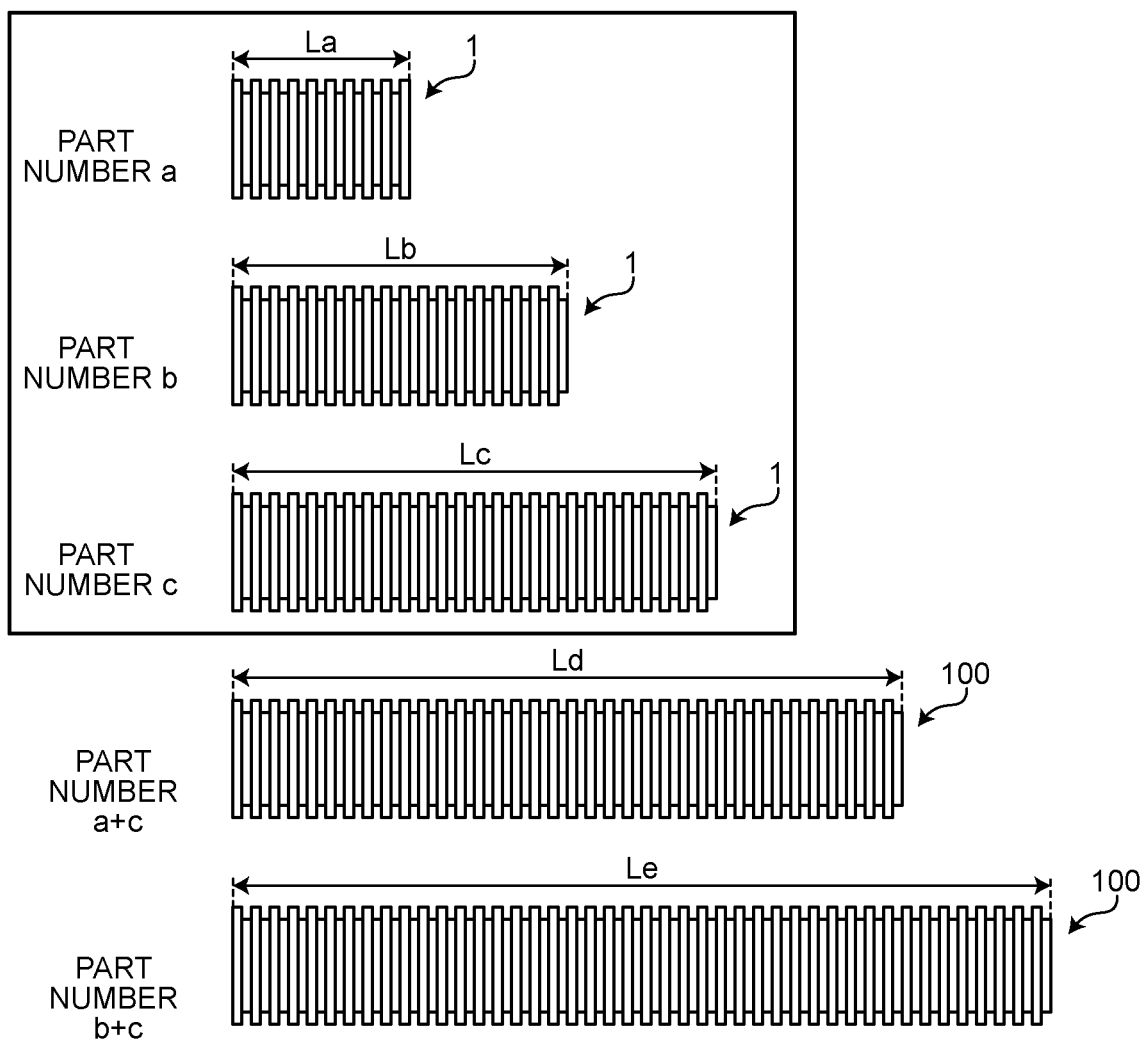
FIG. 11 is a schematic view illustrating an example of product numbers corresponding to the exterior materials and the exterior material connecting bodies according to the embodiment.

The cutting process (step S1) is a process of forming at least two exterior materials, by cutting one exterior material 1 between the first uneven region 3 and the second uneven region 4 adjacent to the first uneven region 3 in the bellows part 2. Specifically, first, as the cutting process, the worker divides the exterior material 1 into two exterior materials 1 (1A, 1B), by providing the slit 2b on the exterior material 1, and then cutting the bellows part 2 at the division location C (FIG. 2, FIG. 4). For example, as illustrated in FIG. 11, the exterior material 1 corresponding to the part number a has the length La in the axial direction X. The exterior material 1 corresponding to the part number b has the length Lb in the axial direction X. The exterior material 1 corresponding to the part number c has the length Lc in the axial direction X. In this example, the lengths of the exterior materials 1 with the part numbers a to c satisfy the relation of La<Lb<Lc. The worker can manufacture three types of exterior materials 1 with the part numbers a to c having different lengths from each other, by cutting the exterior material 1 with the length (La+Lb+Lc) at the two division locations C.

The exterior material connecting process (step S2) is a process of forming one exterior material connecting body 100 by, of the two exterior materials 1A and 1B, connecting the first uneven region 3 located on one end part of the bellows part 2 in one exterior material 1A and the second uneven region 4 located on the other end part of the bellows part 2 in the other exterior material 1B to each other, by overlapping the second uneven region 4 to the radially inner side of the first uneven region 3. Specifically, as illustrated in FIG. 7, as the exterior material connecting process, the worker forms the exterior material connecting body 100 by overlapping the first uneven region 3 of the exterior material 1A with the second uneven region 4 of the exterior material 1B from the radially outer side (FIG. 5 to FIG. 9). For example, as illustrated in FIG. 11, the worker forms the exterior material connecting body 100 with the length Ld in the axial direction X, by connecting the exterior material 1 corresponding to the part number a and the exterior material 1 corresponding to the part number c. In this example, the length Ld satisfies Ld≤(La+Lc). Moreover, the worker forms the exterior material connecting body 100 with the length Le, by connecting the exterior material 1 corresponding to the part number b and the exterior material 1 corresponding to the part number c. In this example, the length Le satisfies Le≤(Lb+Lc). In this manner, for example, compared to the conventional products that need to prepare five part numbers with different lengths from each other, it is possible to correspond to five or more types of products, only with three part numbers with different lengths from each other. Consequently, with the exterior material connecting body 100, by combining several exterior materials 1 with basic lengths, it is possible to manufacture products with different lengths from each other, and reduce the number of part numbers of the product.

The wiring material housing process (step S3) is a process of housing the wiring material W inside the exterior material connecting body 100, via the slit 2b provided on the exterior material connecting body 100. Specifically, the worker houses a part of the wiring material W inside the exterior material connecting body 100, by opening the slit 2b provided on the exterior material connecting body 100 in the radial direction.

The tape winding process (step S4) is a process of winding tape around the outer periphery of the exterior material connecting body 100 including at least both ends of the exterior material connecting body 100 in the axial direction X, with respect to the exterior material connecting body 100 in which the wiring material W is housed. Specifically, the worker fixes the exterior material connecting body 100 and the wiring material W to each other, by winding an insulating tape and the like around both ends of the exterior material connecting body 100 in the axial direction X, and the wiring material W led out from both ends of the exterior material connecting body 100 in the axial direction X. Conventionally, in the case of manufacturing the wire harness WH by assembling the exterior materials with different lengths to the wiring material W, the worker needs to perform an operation of fixing both ends of one exterior material by tape winding, before fixing both ends of the other exterior material by tape winding.

On the other hand, with the exterior material 1 according to the present embodiment, after connecting the exterior materials to each other, the worker can fix the exterior material connecting body 100 to the wiring material W at three locations in total, at one location on the connection part 7, and at two locations on both ends of the connected exterior material connecting body 100 in the axial direction X. Hence, it is possible to reduce man-hours for processing the wire harness WH, and improve the workability of manufacturing the wire harness WH.

As described above, in the exterior material 1, the exterior material connecting body 100, and the wire harness WH according to the present embodiment, the bellows part 2 includes the first uneven regions 3 and the second uneven regions 4. The first uneven region 3 includes one first groove part 11 among the groove parts 6, and two first ridge parts 10 among the ridge parts 5. The second uneven region 4 includes one second groove part 21 having the outer diameter T2o that is relatively shorter than the inner diameter T1i of the first groove part 11 among the groove parts 6, and two second ridge parts 20 having the outer diameter Y2o that is relatively shorter than the inner diameter Y1i of the first ridge parts 10 among the ridge parts 5. In the exterior material 1 and the wire harness WH according to the present embodiment, the first uneven regions 3 and the second uneven regions 4 are alternately aligned along the axial direction X.

With the configuration described above, compared to the conventional exterior material, the exterior material 1 can reconnect the exterior materials to each other by, of the exterior materials 1 cut into two, connecting the first uneven region 3 of the other exterior material 1 to the second uneven region 4 of one exterior material 1. As a result, the exterior material 1 can reproduce the exterior materials 1 with different types of lengths, by combing the exterior materials 1 with different lengths. Hence, it is possible to reduce the number of parts and reduce the cost of managing parts.

Moreover, in the exterior material connecting body 100 according to the present embodiment, the first uneven region 3 located on one end part of the bellows part 2 in one exterior material 1A, and the second uneven region 4 located on the other end part of the bellows part 2 in the other exterior material 1B are connected to each other, by overlapping the second uneven region 4 to the radially inner side of the first uneven region 3. For example, in the case of manufacturing the wire harness WH by assembling the exterior materials with different lengths to the wiring material W, conventionally, a total of four fixing operations are required, as both ends of one exterior material are fixed to the wiring material W by tape winding, before both ends of the other exterior material are fixed to the wiring material W by tape winding. The exterior material connecting body 100 according to the present embodiment can connect the exterior materials 1 to each other by the configuration described above. Hence, the exterior material connecting body 100 can be fixed to the wiring material W at three locations in total, at one location on the connection part 7, and at two locations on both ends of the connected exterior material connecting body 100 in the axial direction X. Hence, it is possible to improve the workability of manufacturing the wire harness WH.

Moreover, in the exterior material connecting body 100 according to the present embodiment, the second uneven region 4 includes the second groove part 21 having the outer diameter T2$o$ that is relatively shorter than the inner diameter T1$i$ of the first groove part 11, and the two second ridge parts 20 having the outer diameter Y2$o$ that is relatively shorter than the inner diameter Y1$i$ of the first ridge part 10. Then, the exterior material connecting body 100 includes the connection part 7, in which the uneven portion 4$a$ formed on the radially outer side of the second uneven region 4 faces the uneven portion 3$b$ formed on the radially inner side of the first uneven region 3 in the radial direction Z, and the uneven portion 3$b$ and the uneven portion 4$a$ are fitted to each other. Consequently, the exterior material connecting body 100 is not premised on the connection between the exterior materials. Hence, compared to the conventional exterior material in which the outer diameter of the wire harness is increased at the connection portion of the exterior materials, the exterior material connecting body 100 can maintain the outer diameter of the wire harness WH to which the exterior material connecting body 100 is externally attached in a substantially constant manner, and prevent the outer diameter of the wire harness WH from increasing partially. Furthermore, even if the external force is applied to the connection part 7 in the axial direction X, the uneven portion 3$b$ and the uneven portion 4$a$ are fitted to each other. Hence, the exterior material connecting body 100 can disperse the external force, reduce the deformation caused by the external force, and further strengthen the connection between the exterior materials.

Still furthermore, in the exterior material 1, the exterior material connecting body 100, and the wire harness WH according to the present embodiment, the first uneven region 3 is formed by the two first ridge parts 10 with the one first groove part 11 interposed therebetween, and the second uneven region 4 is formed by the two second ridge parts 20 with the one second groove part 21 interposed therebetween. Consequently, the exterior material connecting body 100 can increase the connection margin between the exterior materials by, of the exterior materials 1 cut into two, connecting the two first ridge parts 10 with the one first groove part 11 interposed therebetween of the first uneven region 3 in the second exterior material 1B to the two second ridge parts 20 with the one second groove part 21 interposed therebetween of the second uneven region in the first exterior material 1A.

Moreover, because the exterior material 1 according to the present embodiment has the slit 2$b$ formed along the axial direction X, it is possible to easily house the wiring material W inside the exterior material 1.

In the exterior material connecting body 100 according to the present embodiment, the two exterior materials 1A and 1B are connectable in the axial direction X. The first uneven region 3 located on one end part of the bellows part 2 in one exterior material 1A, and the second uneven region 4 located on the other end part of the bellows part 2 in the other exterior material 1B are connected to each other, by overlapping the second uneven region 4 to the radially inner side of the first uneven region 3. Consequently, in the exterior material connecting body 100, the two exterior materials 1A and 1B can be easily connected in the axial direction X.

The wire harness WH has the conductive wiring material W and the exterior material 1 that is externally attached to the wiring material W. Hence, the wire harness WH can exhibit the same effects as those of the exterior material 1 and the exterior material connecting body 100 described above.

In the embodiment described above, the first uneven region 3 includes one first groove part 11 and two first ridge parts 10, and the second uneven region 4 includes one second groove part 21 and two second ridge parts 20. However, it is not limited thereto. For example, the first uneven region 3 may also include one first groove part 11 and one first ridge part 10, and the second uneven region 4 may also include one second groove part 21 and one second ridge part 20.

Moreover, in the bellows parts 2 and 2A in the embodiment described above, the first uneven region 3 is an end part on one side in the axial direction X, and the second uneven region 4 is an end part on the other side. However, it is not limited thereto. For example, in the bellows parts 2 and 2A, both ends in the axial direction X may be the first uneven regions 3 or the second uneven regions.

Furthermore, in the embodiment described above, the bellows parts 2 and 2A have the constant thickness d. By relatively reducing the thickness d, similar to the conventional corrugated tube, it is possible to ensure the flexibility of the bellows parts 2 and 2A. On the other hand, by relatively increasing the thickness d of the bellows parts 2 and 2A, the bending strength of the exterior material 1 is increased. Hence, similar to the conventional hard tube and the like, it is possible to protect the wiring material W from the external force and the like applied to the wire harness WH.

Still furthermore, in the exterior material connecting body 100 in the embodiment described above, the exterior materials 1 are connected to each other. However, it is not limited thereto, and the exterior material 1 and the exterior material connecting body 100 may be connected, and the exterior material connecting bodies 100 may be connected to each other. Still furthermore, in the exterior material connecting body 100, the exterior material 1A with a relatively thick thickness d may be connected to the exterior material 1B with a relatively thin thickness d.

Still furthermore, in the exterior material connecting body 100 in the embodiment described above, the two exterior materials 1A and 1B are connected. However, it is not limited thereto, and three or more exterior materials 1 may also be connected.

Still furthermore, in the embodiment described above, each of the bellows parts 2 and 2A has the slit 2b. However, it is not limited thereto, and the bellows parts 2 and 2A may not have the slit 2b.

With the exterior material, the exterior material connecting body, the wire harness, and the method of manufacturing a wire harness according to the present embodiment, it is possible to advantageously improve the workability of manufacturing a wire harness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An exterior material, comprising:
a bellows part that includes
a plurality of ridge parts annularly formed around a center axis along an axial direction and that project toward one side in a radial direction intersecting the axial direction, and
a plurality of groove parts annularly formed around the center axis and that are recessed toward another side in the radial direction,
the plurality of ridge parts and the plurality of groove parts being alternately aligned along the axial direction, and
the bellows part being externally attached to a wiring material, wherein
the bellows part includes
a first uneven region that has at least one first groove part among the plurality of groove parts, and at least one first ridge part among the plurality of ridge parts, and
a second uneven region that has at least one second groove part having an outer diameter relatively shorter than an inner diameter of the first groove part, among the plurality of groove parts, and at least one second ridge part having an outer diameter relatively shorter than an inner diameter of the first ridge part, among the plurality of ridge parts,
the first uneven region and the second uneven region are alternately aligned along the axial direction, and
the bellows part has a slit formed along the axial direction.

2. The exterior material according to claim 1, wherein
the first uneven region includes two first ridge parts with one first groove part interposed therebetween, and
the second uneven region includes two second ridge parts with one second groove part interposed therebetween.

3. A wire harness, comprising:
a wiring material with conductivity; and
at least one exterior material according to claim 1 including the bellows part, wherein
the bellows part being externally attached to the wiring material.

4. The wire harness according to claim 3, wherein
the exterior material has a free end,
the wiring material exits the exterior material at the free end and is exposed at the free end, and
the bellows terminates at the free end.

5. The exterior material according to claim 1, wherein
the bellows includes a first free end and a second free end.

6. An exterior material connecting body, comprising:
at least two exterior materials that include
a bellows part including
a plurality of ridge parts annularly formed around a center axis along an axial direction and that project toward one side in a radial direction intersecting the axial direction, and
a plurality of groove parts annularly formed around the center axis and that are recessed toward another side in the radial direction,
the plurality of ridge parts and the plurality of groove parts being alternately aligned along the axial direction, and
the bellows part being externally attached to a wiring material, wherein
the bellows part includes
a first uneven region that has at least one first groove part among the plurality of groove parts, and at least one first ridge part among the plurality of ridge parts, and
a second uneven region that has at least one second groove part having an outer diameter relatively shorter than an inner diameter of the first groove part, among the plurality of groove parts, and at least one second ridge part having an outer diameter relatively shorter than an inner diameter of the first ridge part, among the plurality of ridge parts,
the first uneven region and the second uneven region are alternately aligned along the axial direction,
the first uneven region is located on an end part on one side in the axial direction of the bellows part,
the second uneven region is located on an end part of another side in the axial direction of the bellows part,
the at least two exterior materials are connectable in the axial direction,
the first uneven region located on the end part on the one side of the bellows part in one of the exterior materials and the second uneven region located on the end part on the other side of the bellows part in an other exterior material of the at least two exterior materials are connected to each other, by overlapping the second uneven region to a radially inner side of the first uneven region, and
the bellows part has a slit formed along the axial direction.

7. A method of manufacturing a wire harness, the method comprising:
a step of cutting an exterior material that includes
a bellows part including
a plurality of ridge parts annularly formed around a center axis along an axial direction and that project toward one side in a radial direction intersecting the axial direction, and
a plurality of groove parts annularly formed around the center axis and that are recessed toward another side in the radial direction,
the plurality of ridge parts and the plurality of groove parts being alternately aligned along the axial direction,
the bellows part being externally attached to a wiring material,
the bellows part including
a first uneven region that has at least one first groove part among the groove parts, and at least one first ridge part among the plurality of ridge parts, and a second uneven region that has at least one second groove part having an outer diameter that is relatively shorter than an inner diameter of the first groove part, among the plurality of groove parts, and at least one second ridge part having an outer diameter that is relatively shorter than an inner diameter of the first ridge part, among the plurality of ridge parts, and the first uneven region and the second uneven region being alternately aligned along the axial direction, the step of cutting including cutting the exterior material between the first uneven region in the bellows part and the second uneven region adjacent to the first uneven region, to form at least two of the exterior materials;

a step of connecting exterior materials to each other by, of the at least two exterior materials, overlapping the second uneven region located on an end part on another side of the bellows part in an other exterior material of the at least two exterior materials to a radially inner side of the first uneven region located on an end part on one side of the bellows part in one of the at least two exterior materials, to form one exterior material connecting body;

a step of housing a wiring material inside the exterior material connecting body via a slit provided on the exterior material connecting body; and a step of winding tape around an outer periphery of the exterior material connecting body including at least both ends of the exterior material connecting body in the axial direction, with respect to the exterior material connecting body in which the wiring material is housed.

\* \* \* \* \*